United States Patent [19]
Saito

[11] Patent Number: 5,261,031
[45] Date of Patent: Nov. 9, 1993

[54] METHOD AND APPARATUS FOR ENLARGING A TREND GRAPH

[75] Inventor: Hiroshi Saito, Fuchu, Japan
[73] Assignee: Kabushiki Kaisha Toshiba, Kawasaki, Japan
[21] Appl. No.: 506,026
[22] Filed: Apr. 9, 1990
[30] Foreign Application Priority Data
  Apr. 10, 1989 [JP] Japan ................................. 1-90215
[51] Int. Cl.⁵ ............................................. G06F 15/62
[52] U.S. Cl. ................................... 395/140; 395/155
[58] Field of Search ............... 395/133, 139, 140, 155
[56] References Cited
  U.S. PATENT DOCUMENTS
  4,847,785  7/1989  Stephens ..................... 395/139 X
  4,893,258  1/1990  Sakuragi ..................... 395/139

*Primary Examiner*—Heather R. Herndon
*Assistant Examiner*—Almis Jankus
*Attorney, Agent, or Firm*—Foley & Lardner

[57] ABSTRACT

In an enlarged trend graph displaying method, a portion of an overall trend graph is enlarged so as to be displayed on a display screen subdivided into upper and lower reduced display sections and a middle enlarged display section. This enlarged trend graph displaying method comprises the steps of: calculating both a display area ratio of the middle enlarged display section to an overall display area of the screen for displaying the overall trend graph, and an enlargement ratio thereof, and also for calculating a reduction ratio of each of the upper and lower reduced display sections based upon the display area ratio and enlargement ratio of the middle enlarged display section; setting first data on the overall trend graph which has been enlarged by the enlargement ratio as a first virtual screen image indicative of the middle enlarged display section; setting second and third data on upper and lower portions of the overall trend graph which each has been reduced by the same reduction ratio as second and third virtual screen images representative of the upper and lower reduced display sections; scrolling a display position designating window for the first virtual screen image indicative of the middle enlarged display section, and simultaneously moving a viewport for the enlarged display section within the display screen in conjunction with the scrolling operation, whereby the overall trend graph is displayed on the display screen subdivided into the upper and lower reduced display sections and middle enlarged display section, and also the middle enlarged display section is moved within the display screen and displayed with having top priority with respect to displays for the upper and lower reduced display sections.

13 Claims, 4 Drawing Sheets

METHOD AND APPARATUS FOR ENLARGING A TREND GRAPH

BACKGROUND OF THE INVENTION

1. Field of the Invention

The present invention generally relates to a method and an apparatus for time-sequentially displaying acquired data as a trend graph on a display unit such as CRT (cathode-ray tube). More specifically, the present invention is directed to such a method and apparatus capable of displaying a trend graph by a middle enlarged display portion, and upper and lower reduced display portions on the display screen.

2. Description of the Related Art

In a trend graph display system, acquired data is normally displayed in reduced form in order to save a display area. As a consequence, when it is desired that detailed data be displayed, a portion of the original trend graph must be enlarged and displayed on the monitor screen.

FIG. 1 represents a typical display condition of the conventional trend graph displaying method where an overall original trend graph has been enlarged. Since only a portion of acquired data is displayed on the display screen 1 which cannot entirely display the enlarged overall trend graph, a hatched portion of a display position indication 6 is actually displayed as the trend graph thereon. Therefore, to display other desirable data of the enlarged trend graph, a pair of scroll keys 5A and 5B are manipulated so that the actual display positions of the enlarged trend graph are sequentially changed.

As apparent from the conventional trend graph representation shown in FIG. 1, since only a part of acquired data is displayed when the overall trend graph is enlarged, or expanded, it is impossible to compare this displayed data portion (i.e., a portion of the enlarged trend graph) with other undisplayed data portion of the overall acquired data. Moreover, the scroll keys 5A and 5B must be manipulated in order to display the desirable data on the screen 1. In this case, a definite decision may not always be made which scroll key 5A or 5B must be operated. This is because it may be difficult to judge which direction, the displayed trend graph must be scrolled. These drawbacks are mainly caused by the fact that the overall trend data cannot be displayed on the screen when the overall original trend graph is enlarged.

The present invention has been made in an attempt to solve the above-described drawbacks of the conventional trend graph displaying method, and therefore has an object to provide a novel method for displaying overall trend data even when the original trend graph is partially enlarged. Another object of the present invention is to provide an apparatus capable of displaying overall trend graphic data under the condition that the original trend graph is partially enlarged.

SUMMARY OF THE INVENTION

To achieve the above-described objects of the present invention, a trend graph displaying method, according to the present invention, comprises the steps of:

calculating both a display area ratio of the middle enlarged display section (30) to an overall display area of the screen (100) for displaying the overall trend graph, and an enlargement ratio thereof, and also for calculating a reduction ratio of each of the upper and lower reduced display sections (20:40) based upon the display area ratio and enlargement ratio of the middle enlarged display section (30);

setting first data on the overall trend graph which has been enlarged by said enlargement ratio as a first virtual screen image (8) indicative of said middle enlarged display section (30);

setting second and third data on upper and lower portions of the overall trend graph which each has been reduced by the same reduction ratio as second and third virtual screen images (7:9) representative of said upper and lower reduced display sections (20:40);

scrolling a display position designating window for said first virtual screen image (8) indicative of said middle enlarged display section (30), and simultaneously moving a viewport (32) for said enlarged display section (30) within said display screen (100) in conjunction with the scrolling operation, whereby the overall trend graph is displayed on the display screen (100) subdivided into the upper and lower reduced display sections (20:40) and middle enlarged display section (30), and also the middle enlarged display section (30) is moved within the display screen (100) and displayed with having top priority with respect to displays for the upper and lower reduced display sections (20:40).

Furthermore, a trend graph displaying apparatus, according to the present invention, comprises:

calculation means (120:140) for calculating both a display area ratio of the middle enlarged display section (30) to an overall display area of the display screen (100) for displaying the overall trend graph, and an enlargement ratio thereof, and also for calculating a reduction ratio of each of the upper and lower reduced display sections (20:40) based upon said display area ratio and enlargement ratio of the middle enlarged display section (30);

storage means (160) for storing first data on the overall trend graph which has been enlarged by said enlargement ratio as a first virtual screen image (8) indicative of the middle enlarged display section (30), and for storing second and third data on upper and lower portions of the overall trend graph which each has been reduced by the same reduction ratio as second and third virtual screen images (7:9) representative of the upper and lower reduced display sections (20:40), respectively; and, means (5A:5B:190) for scrolling a display-position designating window for said first virtual screen image (8) indicative of the middle enlarged display section (30), and for simultaneously moving a viewport (32) for the middle enlarged display section (30) within the display screen (100) in conjunction with the scrolling operation, whereby the overall trend graph is displayed on the display screen (100) subdivided into the upper and lower reduced display sections (20:40), and the middle enlarged display section (30), and also said middle enlarged display section (30) is moved within the display screen (100) and displayed with having top priority with respect to displays for the upper and lower reduced display sections (20:40).

BRIEF DESCRIPTION OF THE DRAWINGS

For a better understanding of the present invention, reference is made to the detailed description in conjunction with the accompanying drawings, in which.

DETAILED DESCRIPTION OF THE PREFERRED EMBODIMENTS

Trend Graph Structure

Figure 1:
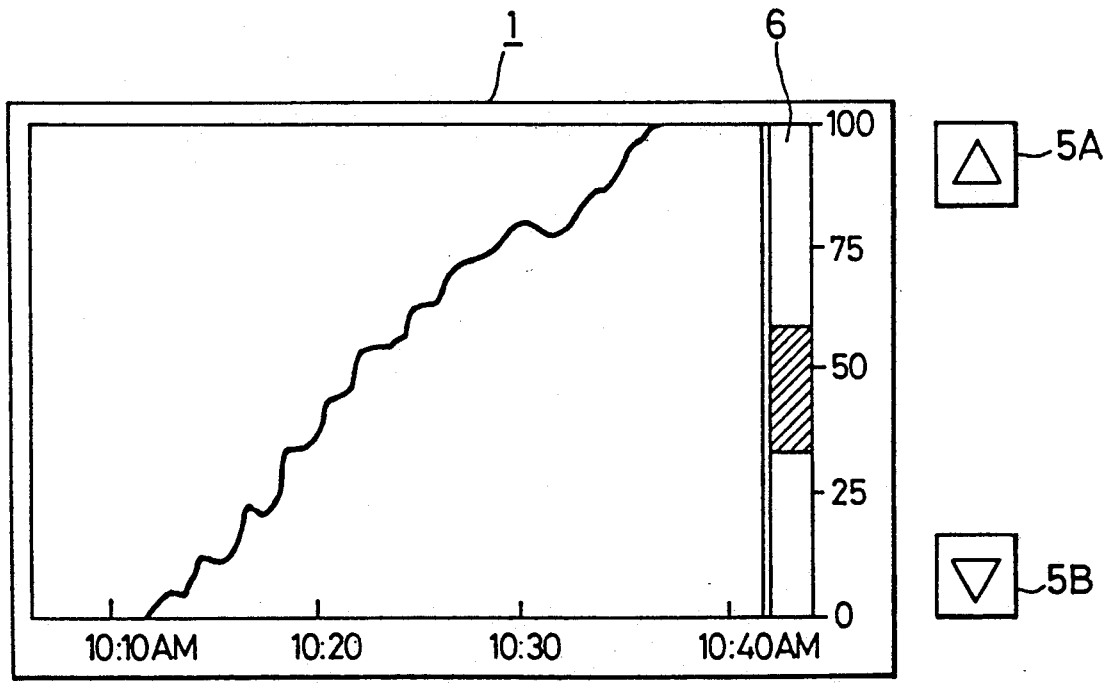
FIG. 1 schematically illustrates a conventional trend graph representation displayed on a monitor screen.
Figure 2:
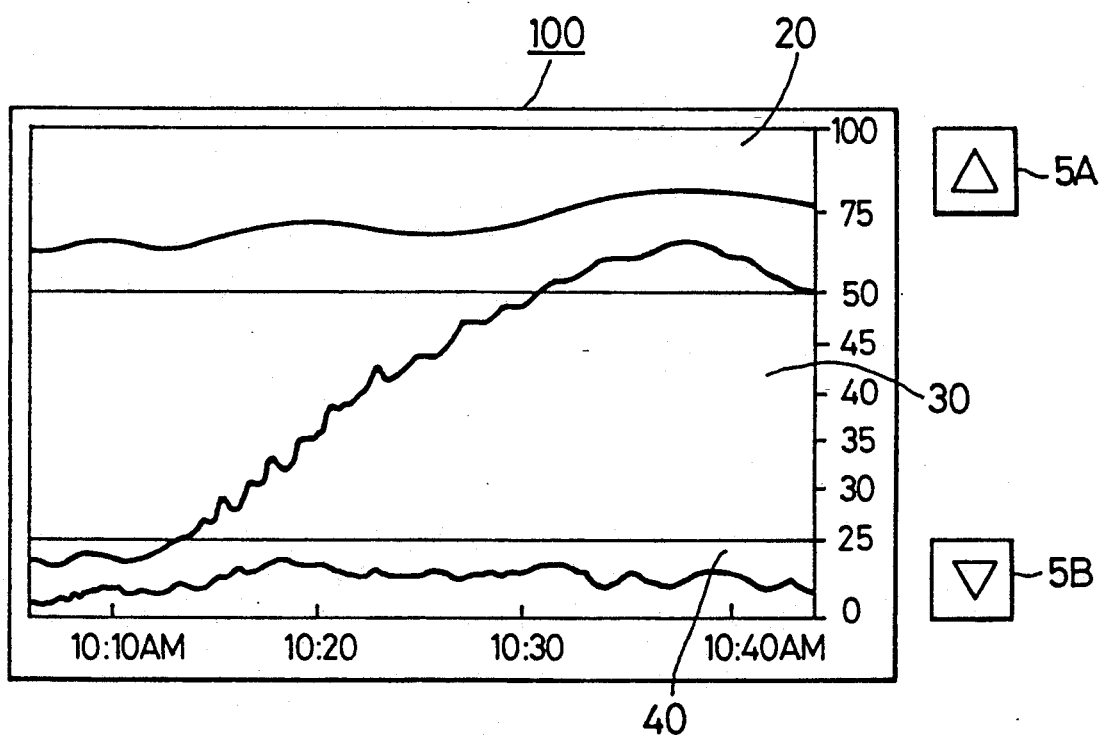
FIG. 2 schematically illustrates a trend graph representation displayed on a monitor screen, according to a first preferred embodiment of the present invention.

In FIG. 2, there is shown a display screen 100 on which an overall trend graph is displayed in accordance with an enlarged trend graph displaying method according to a first preferred embodiment of the present invention.

The trend graph display screen 100 is subdivided into an upper reduced display section 20, a middle enlarged display section 30, and a lower reduced display section 40. A pair of scroll keys 5A and 5B are employed beside this trend graph on display screen 100.

In accordance with the enlarged trend graph displaying method of the first preferred embodiment, both the movement of display frames for the upper and lower reduced display sections 20 and 40 and the middle enlarged display section 30, and the movement of displayed data for the respective display sections 20, 30 and 40 must be simultaneously performed when the scroll keys 5A and 5B are manipulated. To this end, a multi-window function is utilized so as to simplify the above-described display processes. That is to say, all of trend data are drawn on virtual screens. The reduced trend graphic data and also enlarged trend graphic data are drawn on the respective virtual screens, and all of trend graphic data which may be displayed have been drawn thereon.

When the scrolling operation is executed by operating the scroll keys 5A and 5B, the enlarged display data may be changed by varying both the display position designation (window designation) within the virtual screen, and the display position designation (viewport designation) on the actual display screen.

The virtual screen image data which have been drawn on the corresponding virtual screens may be processed in known signal processing circuits so as to be displayed on the actual display screen.

Virtual Screen Drawing

Figure 3:
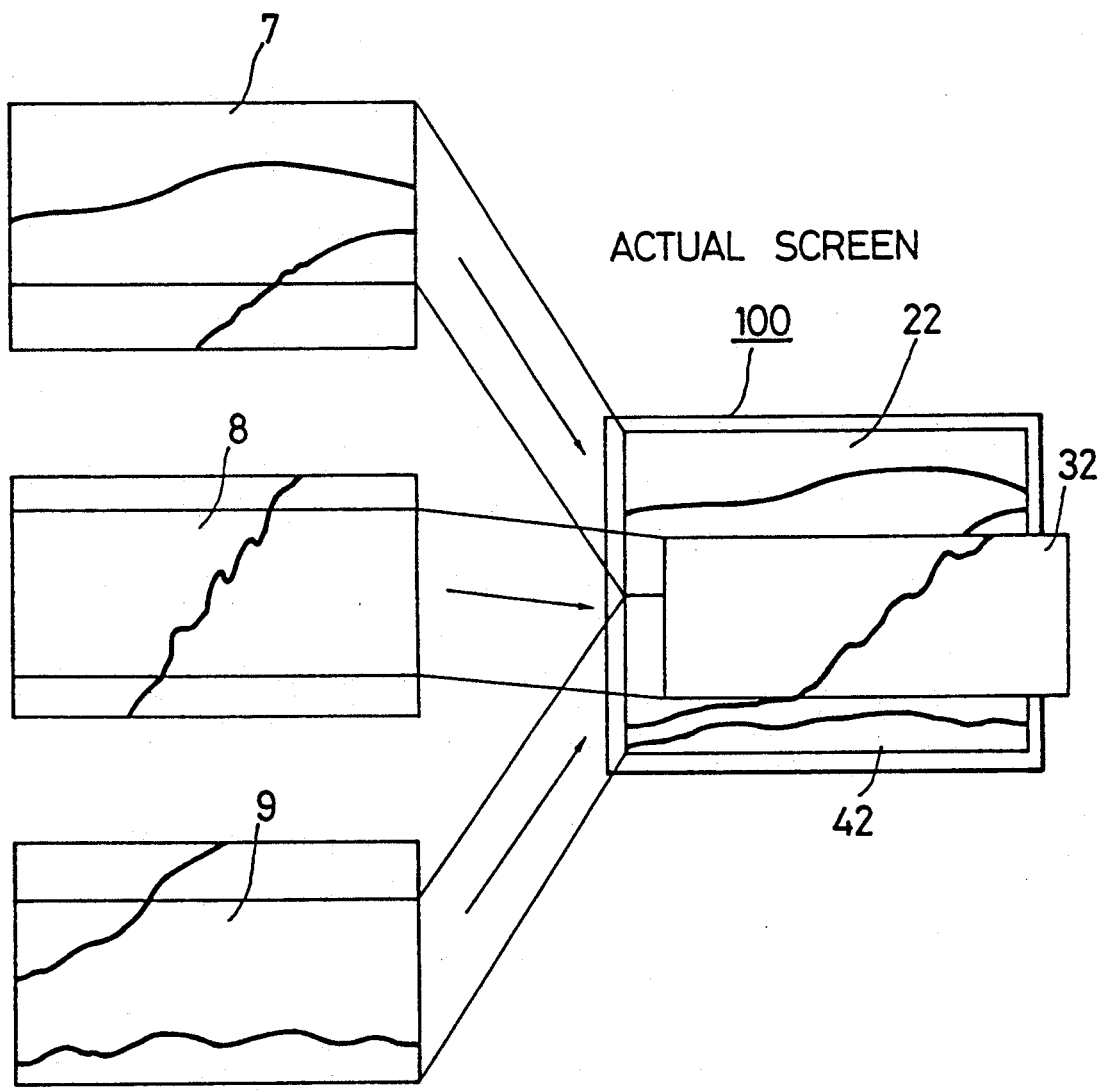
FIG. 3 is an illustration for explaining the trend graph displaying method according to the first preferred embodiment of the present invention; and, FIG. 4 is a schematic block diagram of an arrangement of a trend graph displaying apparatus according to the first preferred embodiment of the present invention.

For a better understanding of the above-described virtual screen drawing for the trend graph data, there is shown an actual display screen in connection with virtual screens in FIG. 3.

As represented in FIG. 3, a virtual screen 7 for the upper reduced display section 20, a virtual screen 8 for the middle enlarged display section 30, and a virtual screen 9 for the lower reduced display section 40 are set into each work area for a window display (e.g., stored in a window buffer memory). Also, as shown in FIG. 3, a viewport 22 for the upper reduced display section 20, a viewport 32 for the middle enlarged display section 30, and a viewport 42 for the lower reduced display section 40 are superimposed with each other on the actual trend graph display screen 100 for display purposes. In accordance with the first preferred embodiment, a priority order to display the viewport 32 for the middle enlarged display section 30 is the highest among the displays of other viewports 22 and 42.

Circuit Arrangement of Display Apparatus

Figure 4:
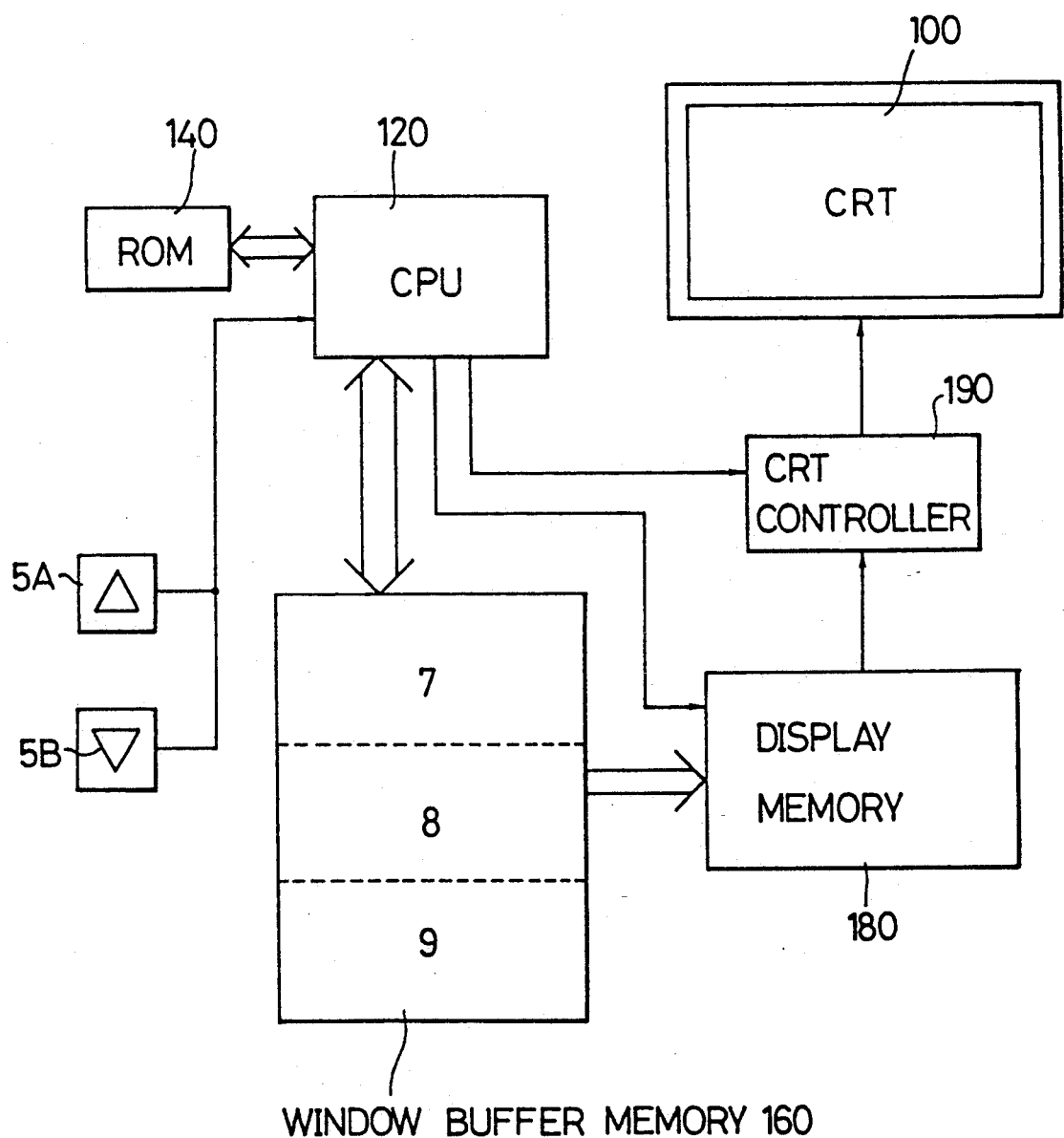

Referring now to FIG. 4, a circuit arrangement of an enlarged trend graph displaying apparatus according to a first preferred embodiment of the present invention will be described, by which the above-described first enlarged trend graph displaying method is executed.

The enlarged trend graph displaying apparatus includes a central processing unit (CPU) 120, a read-only memory (ROM) 140 for previously storing an enlargement/reduction display program; and a window buffer memory 160. This window buffer memory 160 is constructed of three memory areas for the above-described virtual screen images 7 through 9. A display memory 180 is employed so as to temporarily store trend graphic data therein which are furnished from the window buffer memory 160, and also an CRT controller 190 is further employed to control CRT, display screen 100. The scroll keys 5A and 5B are connected to CPU 120.

Enlarging/Reducing of Trend Graph Data

The trend graph enlarging/reducing method according to the first preferred embodiment will now be described in detail with reference to FIGS. 2 to 4.

STEP 1

The enlargement/reduction display program is read out from ROM 140 and the entire system of the trend graph display apparatus is initialized. Then, data on the entire trend graph is enlarged under the control of CPU 120 and the resultant enlarged trend graphic data is stored as the virtual screen image within the window buffer memory 160 for displaying the middle enlarged display section 30 (see the virtual screen 8 in FIG. 3).

STEP 2

Based upon a display area ratio of the middle enlarged display section 30 to an overall display area of the display section 100, an enlargement ratio thereof, and a reduction ratio of the upper and lower reduced display sections 20 and 40 is calculated in CPU 120. Assuming now that the enlargement ratio is selected to be 2, and a display area of the middle enlarged display section 30 is equal to a ½ of the overall display section, since only ¼ portion of the entire display data (i.e., overall trend graphic data) is displayed within the middle enlarged display section 30, ¾ portions of the overall trend graphic data must be displayed by both the upper and lower reduced display sections 20 and 40 which occupy a half of the entire display area. In other words, ⅜-reduced trend graphic data is displayed on each of the upper/lower reduced display sections 20 and 30.

STEP 3

The trend graphs which have been reduced based upon the above reduction ratio, are drawn on one virtual screen (i.e., higher buffer memory area) 7 for the upper reduced display section 20, and also another virtual screen (i.e., lower buffer memory area) 9 for the lower reduced display section 40 (see FIGS. 3 and 4). It should be noted that a size of each virtual screen 7 and 9 is equal to a total size obtained from the upper and lower reduced screens within the actual display screen 100.

STEP 4

While the scroll keys 5A or 5B is operated, the display-position designation window (i.e., window designation) within the virtual screen 8 for the middle enlarged display section 30 is sequentially changed so as to vary the enlarged trend graphic data to be displayed on the actual display screen 100. At the same time, the viewport 32 for the middle enlarged display section 30 is also moved by changing the display position designation window on the actual display screen 100 for the middle enlarged display section 30. As a result, the enlarged trend graphic data desired can be produced which is displayed on the middle enlarged display section 30.

Then, a moving velocity (i.e., a ratio of variation) of the viewport 32 for the middle enlarged display section 30 is determined by both the enlargement ratio of the middle enlarged display section 30 and the reduction ratio of the respective upper/lower reduced display sections 20 and 40. Assuming now that the moving velocity of the display data (i.e., enlarged trend graphic data) on the middle enlarged display section 30 is equal to 1, the moving velocity of the viewport 32 for the middle enlarged display section 30 is determined based on a value obtained by multiplying (1/enlargement ratio) by (reduction ratio). As a result, the data displayed in the middle enlarged display section 30 may be graphically connected with other data displayed in the upper/lower reduced display sections 20 and 40 without dropping out a portion of the overall trend graphic data, as viewed in the lateral direction of the actual display screen 100.

For example, when the display area of the middle enlarged display section 30 is equal to ½ of the overall display area, the enlargement ratio is equal to 2, and the reduction ratio of the respective upper/lower reduced display sections 20 and 40 is equal to ⅔. If the moving velocity of the display data on the middle enlarged display section 30 is selected to be 1, the moving velocity of the viewport 32 for the middle enlarged display section 30 can be determined. This is because the trend graphic data which cannot be displayed within the middle enlarged display section 30 due to this data movement (i.e., scroll), are required to be displayed on both the upper and lower reduced display sections 20 and 40 respectively.

(1/enlargement ratio) × (reduction ratio) = 1/2 × 2/3 = 1/3.

The above-described moving velocity calculation is carried out in CPU 120. The trend graphic data stored as the respective virtual screen images 7 to 9 within the window buffer memory 160 are transferred to the display memory 180 so as to be temporarily stored in this memory 180. Then, the scroll-processed trend graphic images are displayed on the corresponding viewports 22, 32, 42 of the actual display screen 100 under the control of the CRT controller 190.

As previously described, the enlarged/reduced trend graph displaying method and apparatus according to the present invention have the following particular advantages. First, even when a portion of the entire trend graph is enlarged and displayed in the middle part of the actual display screen 100, the overall trend graph can be simultaneously displayed thereon. Accordingly, the data on the enlarged trend graphic portion can be compared with the data on the remaining trend graphic portions. The occasion of mistakenly deciding the scrolling direction when other portions of the entire trend graph is enlarged is also eliminated by the ability to see the entire trend graph.

In addition, if the trend graphic data to be displayed by the upper/lower reduced display sections 20 and 40, and also the middle enlarged display section 30 is written within a single buffer memory as in the conventional method, the overall trend graphic data must be rewritten during the scrolling process. In contrast, according to the preferred embodiment, since the trend graphic data on the overall enlarged display section 30 are independently drawn (i.e. written as the virtual screen image within the middle memory area 8 of the window buffer memory 160), the scrolled trend graphic data on the enlarged display section 30 can be displayed by merely rewriting the read addresses thereof, and also the resultant enlarged trend graph can be smoothly scrolled on the actual display screen 100.

Moreover, both the enlarged trend graph display and display of the overall trend graph can be simultaneously performed without loading heavy workloads of the trend graph display operation to an operator.

What is claimed is:

1. A method for enlarging a portion of an overall trend graph to be displayed on a display screen, said display screen being subdivided into upper and lower reduced display sections and a middle enlarged display section, said middle enlarged display section displaying an enlarged portion of said overall trend graph, said method comprising the steps of:

calculating a reduction ratio of said upper and lower reduced display sections using a display area ratio of said middle enlarged display section to an overall display area of said display screen for displaying said overall trend graph and an enlargement ratio of said middle enlarged display section;

setting, as a first virtual screen image, a first data representative of said overall trend graph which has been enlarged by said enlargement ratio;

setting second and third data representative of upper and lower portions of said overall trend graph, each of which has been reduced by said calculated reduction ratio, as second and third virtual screen images representative of said upper and lower reduced display sections;

scrolling a display-position designating window within said first virtual screen image, said designating window indicating said enlarged portion, and simultaneously moving said middle enlarged display section within said display screen in conjunction with said scrolling; and displaying said overall trend graph on said display screen subdivided into said upper and lower reduced display sections and said middle enlarged display section, wherein said middle enlarged display section is displayed in priority over displays for said upper and lower reduced display sections such that said enlarged portion of said trend graph is visible in said middle enlarged display section of said display screen.

2. A method as recited in claim 1, wherein said calculating step is carried out under the control of a central processing unit in accordance with a calculation program previously stored into a read-only memory.

3. A method as recited in claim 1, wherein said first virtual screen image is set into a first memory area of a window buffer memory.

4. A method as recited in claim 1, wherein said second and third virtual screen images representative of said upper and lower reduced display sections are set into second and third memory areas of a window buffer memory.

5. A method as recited in claim 1, wherein said display-position designating window within said first virtual screen image is scrolled by manipulating a scroll key, and said middle enlarged display section is moved within said display screen under control of a display controller.

6. A method as recited in claim 2, wherein said display area ratio and said enlargement ratio are previously stored in said read-only memory and are provided to said central processing unit.

7. A trend graph displaying apparatus for displaying said trend graph with an enlarged portion on a display screen subdivided into upper and lower reduced display sections and a middle enlarged display section, comprising:

calculation means for calculating a reduction ratio of each of said upper and lower reduced display sections using a display area ratio of said middle enlarged display section to an overall display area of said display screen and an enlargement ratio of said middle enlarged display section;

storage means for storing a first data representative of said overall trend graph which has been enlarged by said enlargement ratio as a first virtual screen image, and for storing second and third data representative of upper and lower portions of said overall trend graph, each being reduced by said reduction ratio, as second and third virtual screen images representative of said upper and lower reduced display sections, respectively; and scrolling means for scrolling a display-position designating window within said first virtual screen image to indicate a portion of said first virtual screen image to be displayed on said middle enlarged section as said enlarged portion and for simultaneously moving said middle enlarged display section within said display screen in conjunction with said scrolling;

wherein said overall trend graph is displayed on said display screen subdivided into said upper and lower reduced display sections and said middle enlarged display section, and said middle enlarged display section is displayed in priority over displays for said upper and lower reduced display sections such that said enlarged portion of said trend graph is visible in said middle enlarged display section of said display screen.

8. A trend graph displaying apparatus as recited in claim 7, wherein said storage means includes a window buffer memory having a first memory area for said first virtual screen image, and second and third memory areas for said second and third virtual screen images representative of said upper and lower reduced display sections.

9. A trend graph displaying apparatus as recited in claim 8, further comprising:

a display memory for temporarily storing said first data on said first virtual screen image, and said second and third data on said second and third virtual screen images, said first data and said second and third data being furnished from said window buffer for display purposes.

10. A trend graph displaying apparatus as recited in claim 7, wherein said scrolling means comprises:

a pair of scroll keys for scrolling said display-position designating window within said first virtual screen image; and, a display controller for simultaneously moving said middle enlarged display section within said display screen in conjunction with said scrolling by said scroll keys.

11. A trend graph displaying apparatus as recited in claim 6, wherein said display area ratio of said middle enlarged display section is selected to be $\frac{1}{3}$ of said overall display area of said display screen, said enlargement ratio thereof is selected to be 2, whereby each of said reduction ratios is calculated to be $\frac{2}{3}$.

12. A trend graph displaying apparatus as recited in claim 7, wherein said calculation means includes:

a read-only memory for previously storing a calculation program; and, a central processing unit for calculating said reduction ratio of each of said upper and lower reduced display sections based upon said display area ratio and said enlargement ratio in accordance with said calculation program.

13. A trend graph displaying apparatus as recited in claim 12, wherein said display area ratio and said enlargement ratio are previously stored in said read-only memory for use by said central processing unit for calculating said reduction ratio.

* * * * *